United States Patent
Bradley

(10) Patent No.: US 7,318,616 B1
(45) Date of Patent: Jan. 15, 2008

(54) VEHICLE FILING CABINET

(76) Inventor: Owen Bradley, P.O. Box 184, Farmington, NM (US) 87499

( * ) Notice: Subject to any disclaimer, the term of this patent is extended or adjusted under 35 U.S.C. 154(b) by 0 days.

(21) Appl. No.: 10/762,068

(22) Filed: Jan. 20, 2004

Related U.S. Application Data

(60) Provisional application No. 60/444,242, filed on Jan. 31, 2003.

(51) Int. Cl.
*B60N 3/12* (2006.01)

(52) U.S. Cl. .................................. 296/37.15

(58) Field of Classification Search ............ 296/24.46, 296/37.1, 37.8, 37.15, 37.14; 312/235.2, 312/235.5, 235.8; 297/188.11, 188.13
See application file for complete search history.

(56) References Cited

U.S. PATENT DOCUMENTS

| | | | | |
|---|---|---|---|---|
| 1,237,750 | A * | 8/1917 | Chappell | 296/37.15 |
| 1,600,977 | A * | 9/1926 | Dameron | 296/37.15 |
| 3,058,771 | A | 10/1962 | Hill et al. | 296/37 |
| 3,321,237 | A * | 5/1967 | Gangell | 296/63 |
| 4,058,333 | A * | 11/1977 | Roe et al. | 292/172 |
| 4,290,658 | A | 9/1981 | DeRosa | 312/108 |
| 4,318,575 | A | 3/1982 | Redlich | 312/250 |
| 4,790,432 | A * | 12/1988 | Rees | 206/315.11 |
| 4,883,317 | A | 11/1989 | Davenport | 297/193 |
| 4,949,890 | A | 8/1990 | Schultz | 224/275 |
| 4,986,589 | A * | 1/1991 | McNew | 296/37.8 |
| 5,096,249 | A * | 3/1992 | Hines | 296/37.15 |
| 5,205,626 | A | 4/1993 | Fotioo | 312/184 |
| 5,222,790 | A | 6/1993 | Latino | 312/315 |
| 5,433,516 | A | 7/1995 | Beals et al. | 312/257.1 |
| 5,469,999 | A | 11/1995 | Phirippidis | 224/542 |
| 5,494,175 | A | 2/1996 | Higdon et al. | 211/46 |
| 5,551,616 | A | 9/1996 | Stitt et al. | 224/275 |
| 5,667,115 | A * | 9/1997 | Verhaeg | 224/275 |
| 5,727,843 | A | 3/1998 | LaTrace | 297/188.13 |
| 5,816,650 | A * | 10/1998 | Lucas, Jr. | 297/188.1 |
| 5,895,086 | A * | 4/1999 | Carico | 296/37.6 |
| 5,902,009 | A | 5/1999 | Singh et al. | 297/188.1 |
| 6,015,198 | A * | 1/2000 | Stair | 312/235.1 |
| 6,039,415 | A | 3/2000 | Bruun | 312/229 |
| 6,074,000 | A * | 6/2000 | Wagner | 297/188.11 |
| 6,264,260 | B1 * | 7/2001 | Kronner et al. | 296/37.15 |
| 6,386,612 | B2 | 5/2002 | Hofmann et al. | 296/37.15 |
| 6,488,327 | B1 * | 12/2002 | Pearse et al. | 296/65.05 |
| 6,644,523 | B1 * | 11/2003 | Salas | 224/275 |
| D487,656 | S * | 3/2004 | Sturhan et al. | D6/500 |
| 6,976,726 | B2 * | 12/2005 | Hirota et al. | 296/146.1 |
| 6,980,082 | B2 * | 12/2005 | Ueda et al. | 340/5.72 |
| 6,980,094 | B2 * | 12/2005 | Matsubara et al. | 340/426.28 |
| 7,010,402 | B2 * | 3/2006 | Flick | 701/36 |
| 2002/0005649 | A1 | 1/2002 | Hofmann et al. | 296/37.15 |

FOREIGN PATENT DOCUMENTS

DE          19947177 A1 *   4/2001

* cited by examiner

*Primary Examiner*—Hilary Gutman
(74) *Attorney, Agent, or Firm*—Deborah A. Peacock; Vidal A. Oaxaca; Peacock Myers, P.C.

(57) ABSTRACT

A vehicle filing cabinet disposed between the floor of a vehicle's cab and seat for supporting the seat and for the secured storage and easy retrieval of files, other paperwork, objects and utensils.

23 Claims, 8 Drawing Sheets

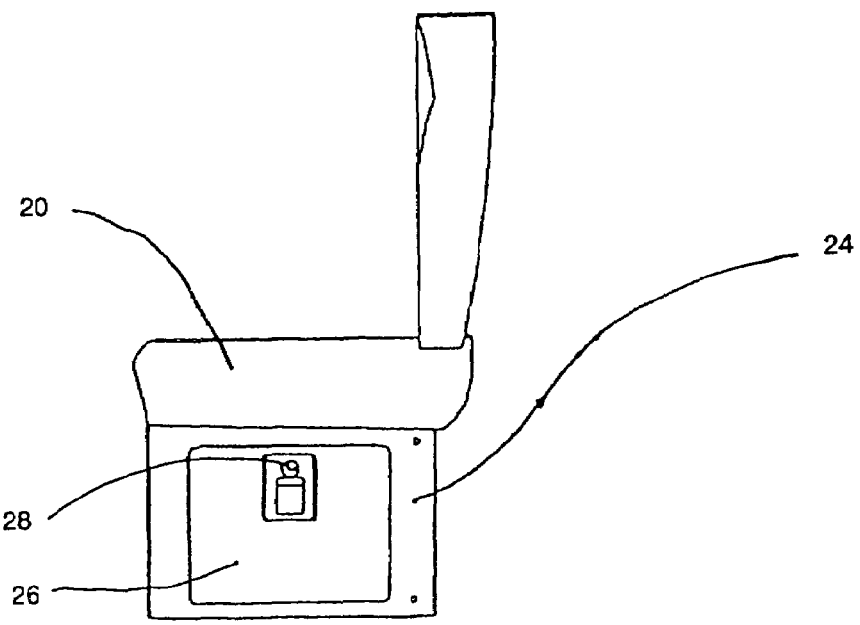
Fig. 2
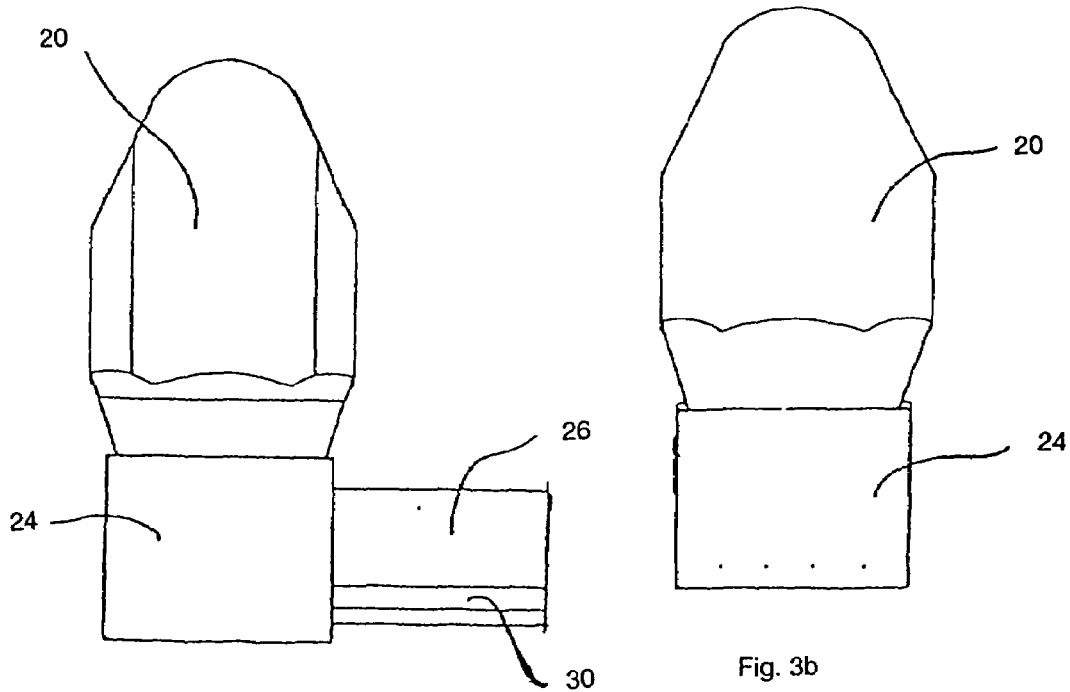
Fig. 3a
Fig. 3b

VEHICLE FILING CABINET

CROSS-REFERENCE TO RELATED APPLICATIONS

This application claims the benefit of the filing of U.S. Provisional Patent Application Ser. No. 60/444,242, entitled "Vehicle Filing Cabinet", filed on Jan. 31, 2003, and the specification thereof is incorporated herein by reference.

BACKGROUND OF THE INVENTION

1. Field of the Invention (Technical Field)

The present invention relates to a file cabinet for supporting a vehicle's seat and for the storage and easy retrieval of files, other paperwork, and utensils that is positioned under a seat of a DOT Class 6, 7, or 8 truck or other transportation vehicles including but not limited to trucks, vans, automobiles, boats and airplanes for the storage of files and other paperwork and that serves as a support for the seat. The invention enhances the storage capability of a vehicle.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

In several occupations (e.g. sales, construction contracting, and those of driving commercial trucks) it is convenient and often necessary to carry files and other paperwork as well as an assortment of catalogs, brochures, utensils, etc. in a vehicle. Many types of storage cabinets, tool boxes, and the like are available for storing and organizing such items. Some can be mounted in a vehicle.

For example, U.S. Pat. No. 6,386,612 discloses a storage system located underneath a vehicle's rear seat. The system includes drawers. U.S. Pat. No. 5,902,009 discloses an underseat storage bin.

Some products are designed to store hanging file style folders. But they are not well suited for transport in vehicles as they occupy space that could be used for other purposes such as passenger space or space for storing other items. For example, some storage systems are disposed on passenger seats and so diminish passenger space.

Some vehicles such as trucks that have no rear seat afford only the confined area behind the seat to store tools and other similar items. But securely storing files and other paperwork behind a seat is cumbersome and retrieval is inconvenient. And, again, storing paperwork behind a seat takes up space that can be dedicated to storing tools and the like.

Therefore, there is a need for a file storage and retrieval system that takes advantage of space that is not usually occupied by persons or other items. The system must securely hold important files.

BRIEF SUMMARY OF THE INVENTION

The present invention comprises a file cabinet and method for use in a vehicle having a cab with a seat and floor. The cabinet comprises a base, upstanding side walls and an upper surface forming an enclosure, and a drawer. The cabinet is disposed between the cab's seat and floor. The cabinet supports the seat, and the seat is preferably a passenger seat disposed adjacent to the vehicle operator's seat.

The cabinet's drawer is oriented, and comprises an opening directed, toward the vehicle operator. A small compartment may be disposed on the door face for holding pens and similar sized objects.

The cabinet is preferably disposed in the cab of a truck designated by classes 6 through 8.

The cabinet comprises fasteners to connect it to the cab's floor and to the seat. The top fasteners optionally provide for the seat to lift away from the cabinet from one edge of the cabinet's upper surface, and the top of the cabinet may comprise a tabletop. The filing cabinet system optionally comprises a backrest disposed on the seat that is foldable forward to provide a tabletop. The cabinet is optionally integral to the seat.

The cabinet may further comprise a locking component optionally disposed on the drawer. The locking component is optionally engageable in response to an "on" or "off" signal from the vehicle and optionally engageable in response to air pressure derived from the vehicle's air brake system.

The cabinet's drawer may comprise a plurality of fasteners to position files in the cabinet when the drawer is closed.

The invention further comprises a container for use in vehicle having a cab with a seat and floor. The container comprises a base, upstanding side walls, an upper surface forming an enclosure, a door, and a locking component disposed on the door. The locking component is engageable in response to an on or off signal from the vehicle.

A primary object of the present invention is to efficiently use the area under the front seat of a vehicle for the secured storage of files and other paperwork as well as utensils of various types.

A primary advantage of the present invention is that it provides an easy, effective means to store and retrieve paperwork with minimum impact on the driving and other storage capacity of a truck and other vehicle.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 is a side view of a file cabinet of the present invention with drawer closed;

FIG. 3a is a front view of a file cabinet of the present invention with drawer open;

FIG. 3b is a rear view of a file cabinet with drawer closed;

DETAILED DESCRIPTION OF THE INVENTION

Figure 1A:
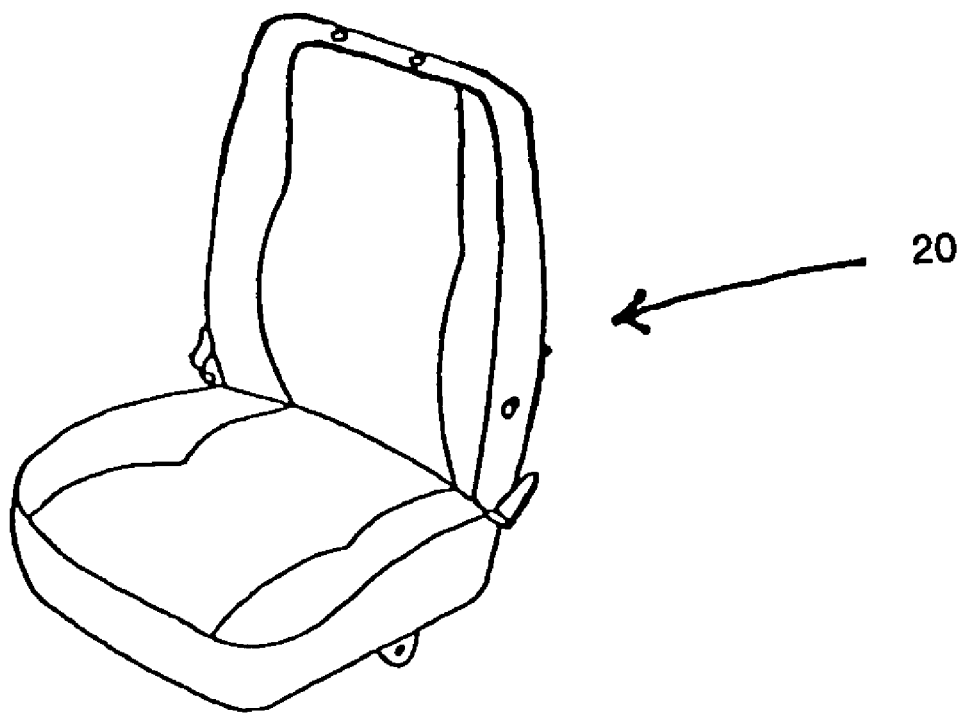
FIG. 1a shows a seat typical of those in Class 8 trucks.

The present invention relates to a vehicle file cabinet for storing files, other paperwork, and utensils that serves as a seat support. The file cabinet preferably comprises a box shape and a sliding, lockable drawer, for storing files and other items. Although the preferred embodiment and figures describe the invention in the context of the cab of a large truck designated as a Class 6, 7, or 8 truck, the file cabinet of the present invention may be used with other transportation vehicles, including but not limited to Class 4 and 5 trucks, smaller trucks, vans, wagons, boats, airplanes, trains, and the like.

Generally, a filing cabinet made in accordance with the present invention comprises a hanging file box unit. The box-shaped unit includes a plurality of side walls having a front panel, a rear panel spaced at a distance away from the front panel, and a pair of opposed side panels spaced apart from each other which connect the front and the rear panels. The file cabinet comprises a drawer, conventional fasteners, a member to secure the drawer's door such as a latch assembly, and drawer sliding, opening, and closing mechanisms known in the art. The drawer may open by sliding on such sliding mechanisms (e.g., rails) or may open via hinging mechanisms. The cabinet's drawer is preferably equipped with a lock to secure the drawer. The face of the drawer door optionally houses a small compartment for pens and other small office amenities.

The file cabinet is preferably mounted between the floor of vehicle's cab and the vehicle's front seat. As the term is used herein, "cab" describes the compartment of any transportation vehicle used and occupied by the driver or operator of the vehicle. Although the file cabinet may optionally be mounted under any seat in the cab, including the front passenger's seat, the driver's seat, and a rear seat if the cab is equipped with one, the preferred location is under the front passenger's seat (i.e., the seat adjacent to the driver's seat). The drawer may face toward the front of the vehicle, toward the inside of the cab, or toward the front passenger's door. If the cab is equipped with a sleeper compartment or other accommodating space behind the front seat or seats, the drawer can face and open toward that rear area of the cab. The preferred orientation is toward the inside of the cab facing the driver so that the driver can easily access the file cabinet's contents.

In vehicles using air brake systems, the use of the drawer may be made safer by inhibiting the ability to open the drawer unless the vehicle's brakes are engaged. In such vehicle's, the brakes are engaged when air pressure does not exist in the braking system's air lines. When the vehicle is moved, the brakes are disengaged by creating air pressure. Means (i.e., a locking component) to lock the cabinet drawer are provided that are put into a locking position in response to the detection of pressure. Such an embodiment is discussed more fully below in relation to FIG. 8. Such a system ensures that the drawer may not be opened while the vehicle is moving thereby enhancing safe driving. In an embodiment using this air locking system, the cabinet may comprise any container or cabinet that is used to store other items that are intended to be inaccessible while the vehicle is moving such as computers, telephones, and the like so that, in such an embodiment, the cabinet is not limited to comprise a cabinet for holding files. Moreover, a container using this air locking system may be positioned anywhere in the vehicle and need not support a seat.

The cabinet is preferably constructed of steel or other structural material, such as aluminum or light-weight steel, of sufficient thickness to provide structural support for the seat. In the preferred embodiment, the cabinet supports the seat under which it is disposed. The file cabinet is configured to accommodate letter or legal sized hanging file folders, or both.

Using fasteners, the file cabinet is preferably fixed to both the floor of the cab and to the seat. Alternatively, the file cabinet may be manufactured as an integral part of the seating unit. Alternatively, the file cabinet may be fixed to the cab's floor and secured to the seat with fasteners such as hinges so that the seat can be lifted in any direction, preferably toward the cab's rear so that the cabinet's top can be exposed. In such an embodiment, the cabinet top may comprise a surface useable as a table and may fold either forward or back. The cabinet may be used as a tabletop, particularly if the seat folds away from the cabinet. An alternative design for providing a tabletop is a filing cabinet and seat system comprising a seat that is foldable down toward the seating portion of the seat so that the rear of the backrest can be used as a tabletop.

The height of the file cabinet may vary to accommodate the original equipment design of the cab and may be modified to accommodate the addition of a cushion for added passenger comfort or to accommodate any seat suspension system such as an "air ride" seat device or system. To lower the height of the file cabinet, the cabinet may incorporate a design that allows the files to lie flat against each other while the file drawer is closed. Upon opening the drawer, the files are manually or mechanically pulled upright.

Figure 1B:
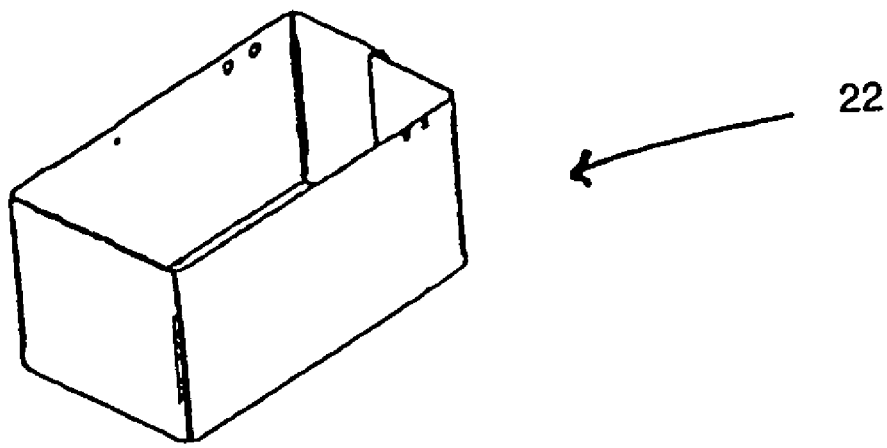
FIG. 1b shows a seat base support typical of Class 8 trucks.

Turning now to the figures, FIG. 1 shows typical original equipment manufacturer seat 20 typical of a large commercial truck such as a Class 8 truck. Seat 20 is typically supported by original equipment manufacturer seat base support 22. In the preferred embodiment, file cabinet 24 supports seat 20 and replaces base support 22.

FIG. 2 shows cabinet 24 attached to, and supporting, seat 20 and comprising drawer 26 and drawer lock 28. FIG. 3a shows cabinet 24 with open drawer 26 which slides open on rails 30 typical of those known in the art. FIG. 3b shows a rear view of cabinet 24 supporting seat 20.

Figure 4:
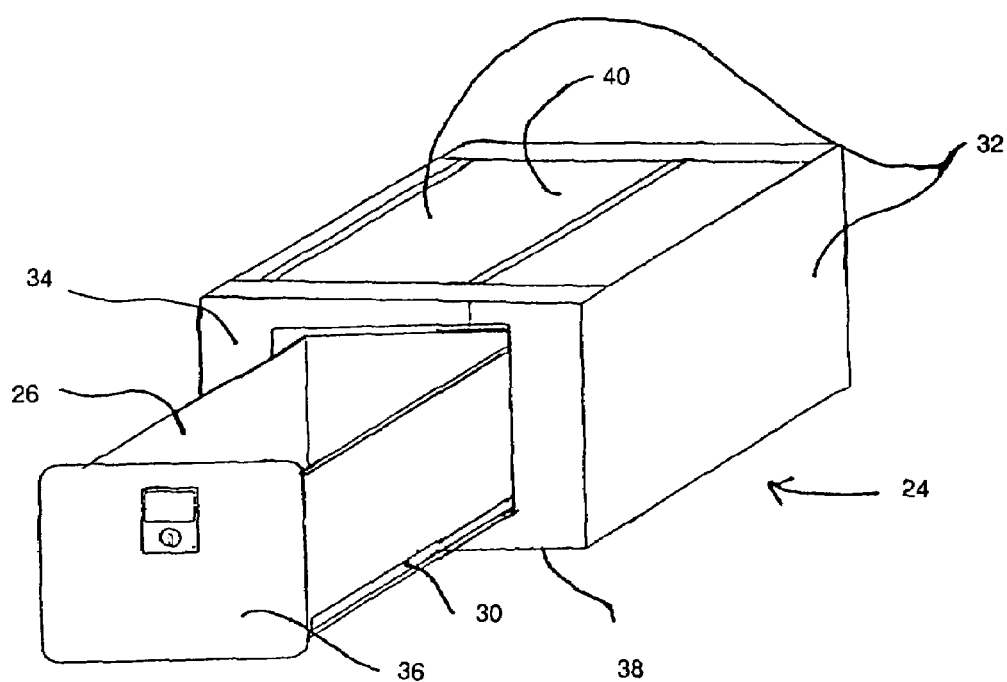
FIG. 4 is an exploded perspective view of a file cabinet of the present invention.
Figure 9:
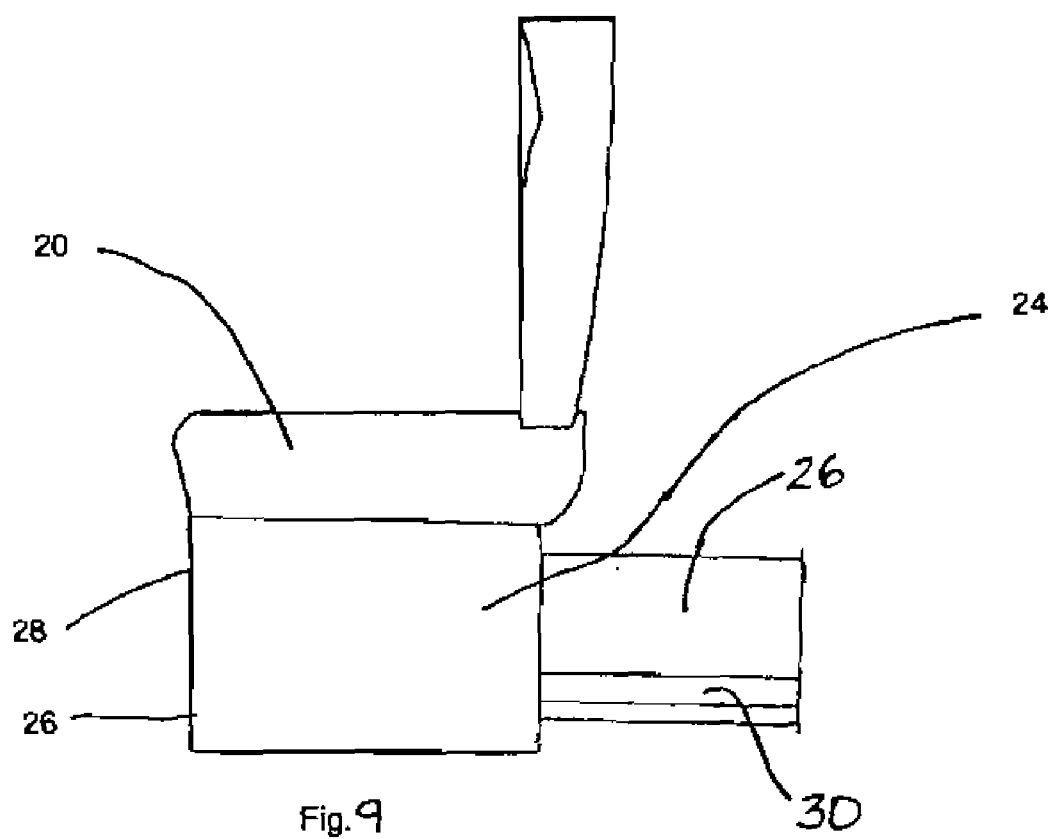
FIG. 9 is a side view of a file cabinet of the present invention with a drawer shown in an open position.
Figure 10:
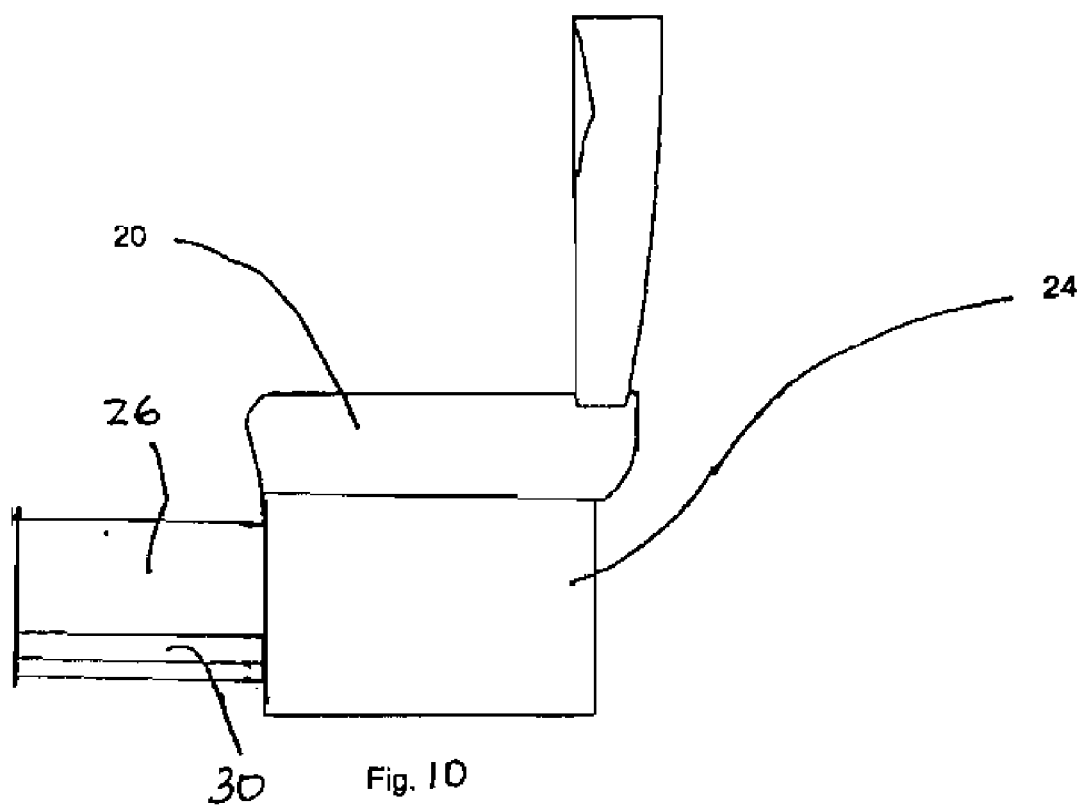
FIG. 10 is side view of a file cabinet of the present invention with a drawer shown in an open position.

FIG. 4 depicts the preferred embodiment of cabinet 24 comprising side panels 32, front panel 34, drawer 26, drawer face 36, drawer rails 30, drawer rail tracks 38, and rear panel 40. This embodiment shows no top panel, but one may be included. As described above, the preferred orientation of cabinet 24 is such that rear panel 40 faces away from the vehicle driver rather than the rear of the cab. FIG. 9, depicts drawer 26 in an open position toward a rear of seat 20. FIG. 10 depicts drawer 26 in an open position toward a front of seat 20.

Figure 5:
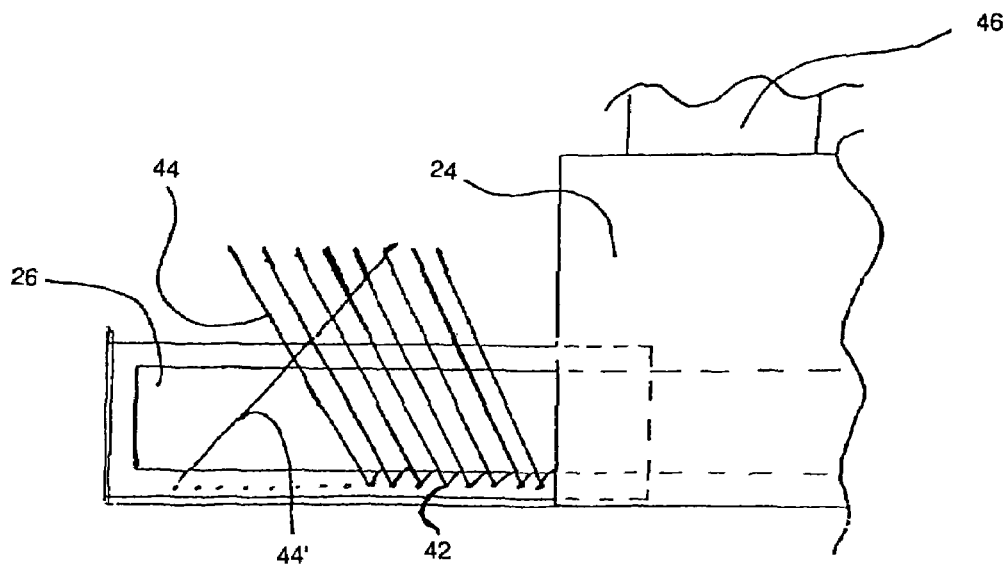
FIG. 5 is a side view of a file cabinet of the present invention with files lying in a semi-horizontal position to accommodate a shorter cabinet height.

FIG. 5 shows an alternative embodiment of cabinet 24 comprising fasteners 42 that hold down the bottoms of files 44, 44' so that they lie oriented in a semi-horizontal position when drawer 26 is closed. When drawer 26 is open, files 44 may be manually or mechanically pulled up for access to their contents. As shown in FIG. 5, files 44 may lie oriented toward the front of drawer 26. Alternatively, files 44' may lie oriented toward the rear of drawer 26. This file configuration provides for a shorter cabinet 24 to accommodate an "air ride" seat cushioning system 46 typical of commercial vehicle seats.

Figure 6:
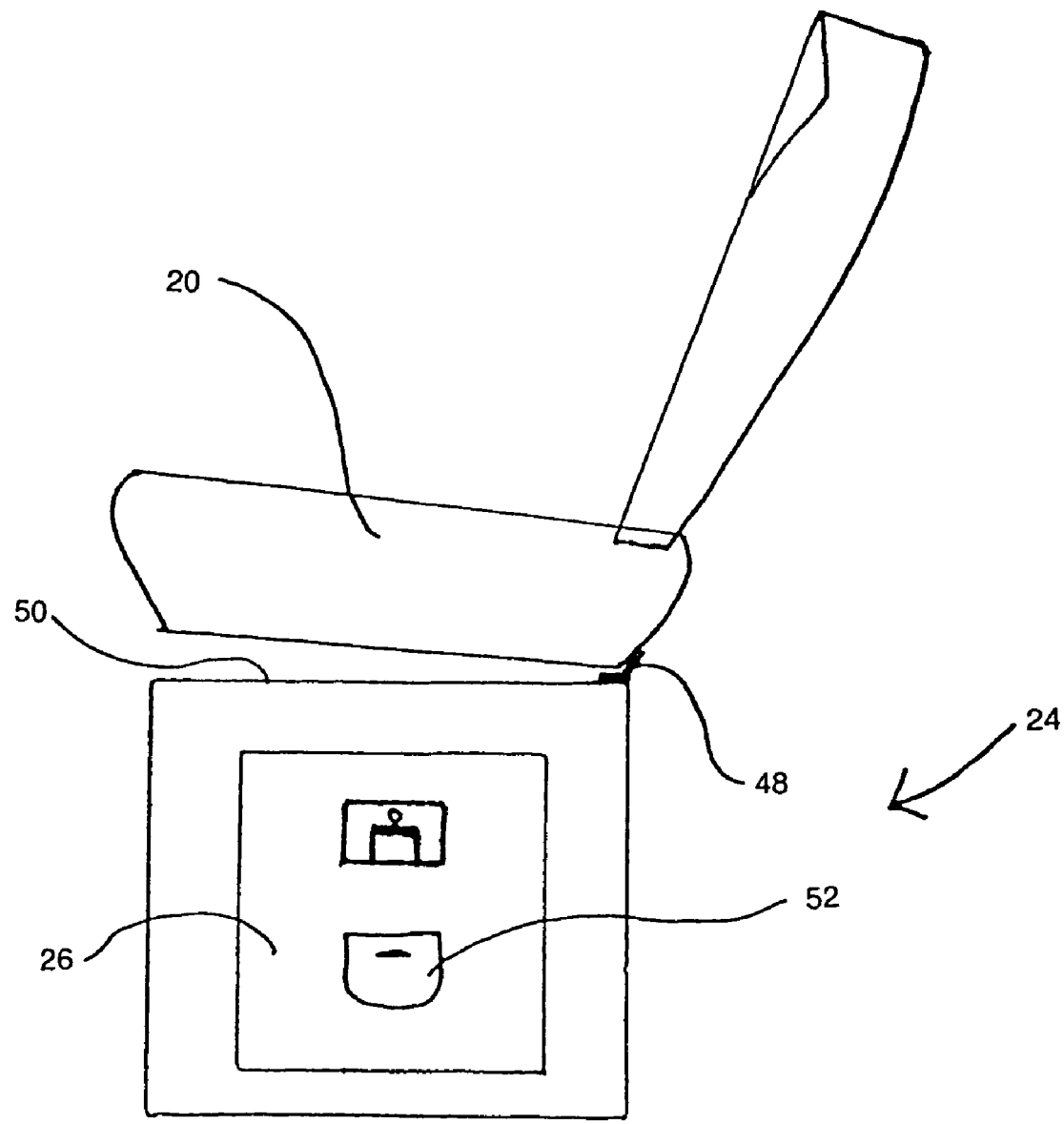
FIG. 6 is a side view of a file cabinet of the present invention with a seat lifting away to expose the cabinet top.

FIG. 6 shows an alternative embodiment of cabinet 24 comprising fastener 48 that provides for the ability of seat 20 to lift away from cabinet 24 to expose cabinet top 50. Thus accessible, cabinet top 50 may be used as a tabletop or desktop. Optional compartment 52 (e.g., for pens, utensils, other objects, and the like) is embedded in drawer 26 and disposed so that compartment 52 may be opened away from the face of drawer 26.

Figure 7:
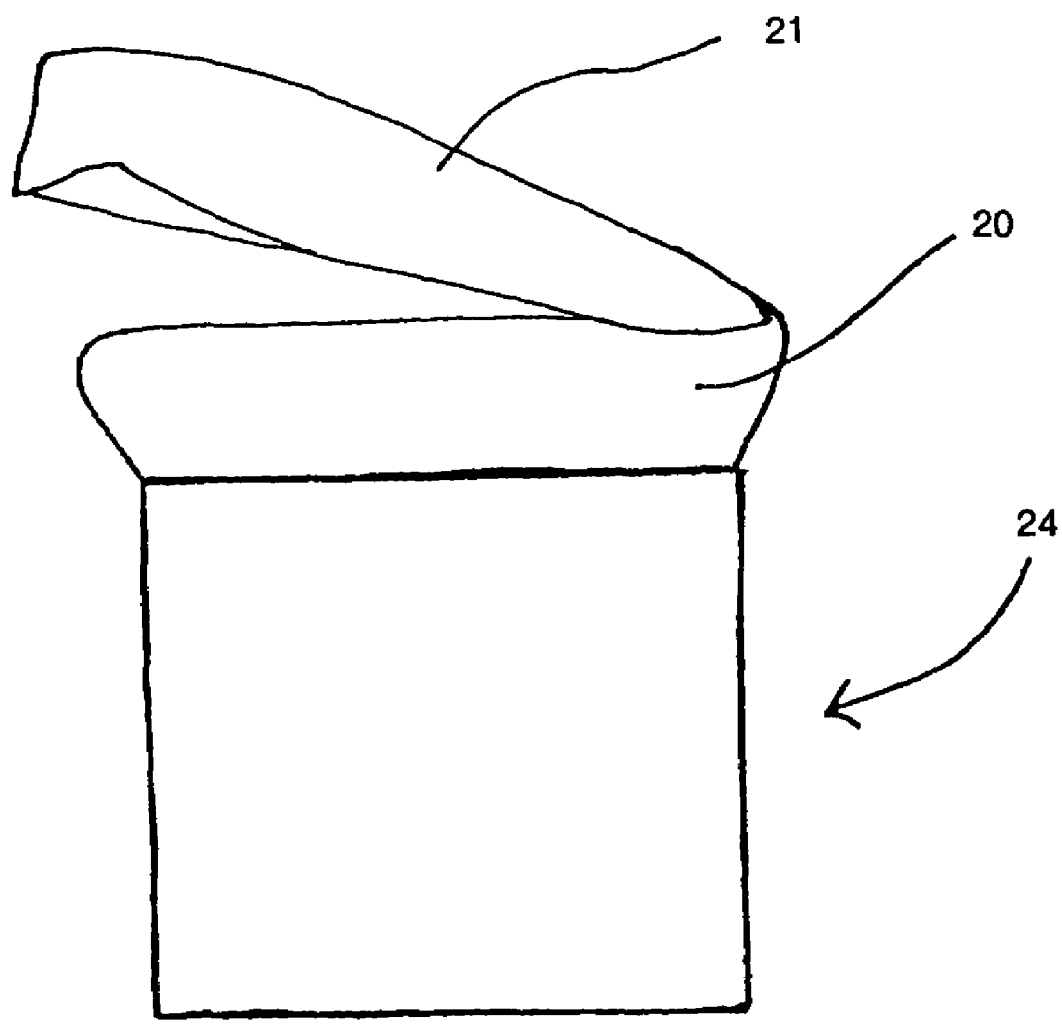
FIG. 7 is a side view of a file cabinet of the present invention with a foldable seat that provides a tabletop.

FIG. 7 shows an alternative embodiment of cabinet 24 wherein backrest 21 of seat 20 is foldable to provide a tabletop or desktop. In another embodiment (not shown), the seat can fold backwards to form a flat or tabletop configuration.

Figure 8:
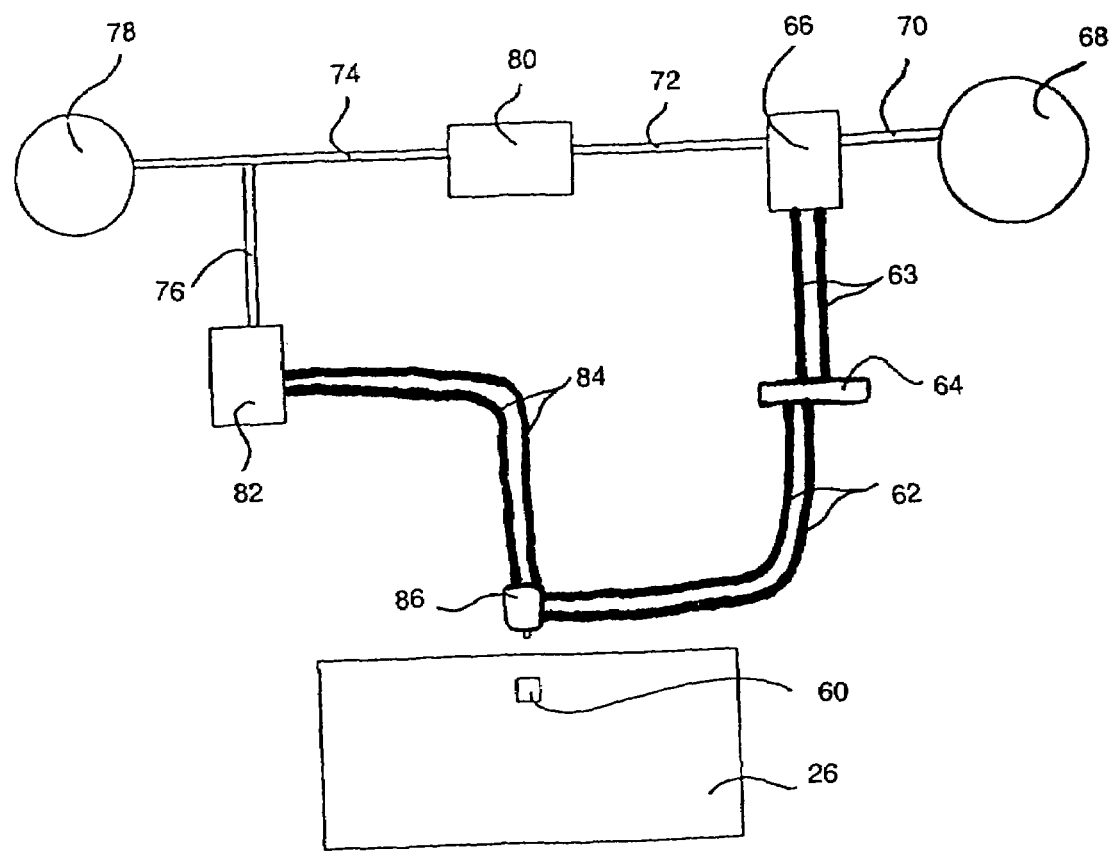
FIG. 8 is a schematic of an air pressure locking component for the cabinet drawer of the present invention.

FIG. 8 shows the preferred embodiment of a schematic of an air pressure locking system for the cabinet drawer of the present invention. Drawer door 26 comprises electrical contact 60 connected via wires 62 to relay 64. When drawer door 26 is closed, an electric signal is sent via wires 62 to relay 64. Relay 64 signals electric air supply valve 66 via wires 63 to open so that air from air supply 68 can flow via conduit 70 to conduit 72. Brake activation valve 80 of air brake system 81 can then be affected by the driver to send air via conduit 74 to brakes 78 so that brakes 78 are released and to conduit 76 so that relay 82 is activated. Upon activation, relay 82 sends an electric signal via wires 84 to lock 86 so that lock 86 is engaged. Once locked, lock 86 cannot be unlocked and drawer door 26 cannot be opened unless the driver brings the vehicle to a stop and closes brake activation valve 80.

Closing activation valve 80 releases air pressure in conduits 74 and 76 so that brakes 78 are engaged and so that relay 82 signals lock 86 to open. Once unlocked, drawer 26 can open. Upon opening drawer 26, electrical contact 60 signals relay 64 to close electric valve 66. As long as electric valve 66 is closed, air cannot be delivered from air supply 68 to brakes 78 and so brakes 78 cannot be released. Lock 86 may be of any type known in the art that will respond to electrical signals for activation. Lock 86 is preferably an electromagnetic plunger type lock.

In another embodiment, relay 82 is eliminated and wires 84 are replaced with conduit for delivering air. In that embodiment, lock 86 comprises any component or mechanism known in the art that responds to air pressure including, but not limited to, plungers, pistons, and the like. Air pressure closes lock 86, and lock 86 is returned to an open position with the aid of a spring or other component capable of returning lock 86 to an open position.

In alternative embodiments (not shown), the file cabinet cannot be opened unless the vehicle is stopped and/or turned off. This can be achieved through other means besides pneumatic means, as discussed above, e.g., via a hydraulic or electronic system. The invention is not limited to a pneumatic embodiment.

In alternative embodiments (not shown), a container not limited to a cabinet for holding files or supporting a seat may be used and need not contain a drawer but a lockable door.

EXAMPLE

A file cabinet was constructed in accordance with the present invention to fit a model W900 Kenworth truck.

The file cabinet was constructed of steel measuring approximately 0.375 inches thick. The file cabinet's dimensions were as follow:
1. the horizontal lengths of the side panels measured approximately 17.25 inches, and their vertical lengths measured approximately 13.5 inches;
2. the horizontal lengths of the panel housing the drawer door and of the opposing panel measured approximately 17.25 inches, and their vertical lengths measured approximately 14.00 inches.

The file cabinet was fastened with screws to the cab floor and to the seat using pre-existing fastener locations. The cabinet supported the seat, replacing the original manufacturer equipment seat base support. The drawer was positioned under the front passenger seat, and the drawer opened toward the driver's seating position.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A seat supporting cabinet for use in a vehicle having a front cab with a seat and floor, said cabinet comprising:
    a base support comprising a bottom portion disposed on the front cab floor, directly underneath a front seat;
    upstanding walls connected to said base support and disposed directly underneath the front seat;
    said base support and said upstanding walls defining an enclosure directly underneath the front seal and including side rails slidably disposed within said enclosure;
    one upstanding wall defining an opening therein into said enclosure;
    a file drawer integral to said cabinet and slidably disposed in said wall opening, said file drawer comprising a bottom, two sides, a front access panel, a back, and an open top, said file drawer secured to said side rails and slidable between a closed position and an open position
    said file drawer fully disposed in said enclosure directly underneath the front seat when in said closed position, said file drawer extending away from said enclosure in said open position;
    said cabinet disposed directly between the front cab seat and the front cab floor and supporting the front cab seat above the front cab floor; and
    said cabinet accessible to a person seated in the front seat of the front cab without having to exit the vehicle.

2. The cabinet of claim 1 wherein the front seat is a passenger seat disposed adjacent to a vehicle operator's seat.

3. The cabinet of claim 2 wherein said opening of said wall is on a side of the front seat between front seats of the cab, so that said file drawer slides to said open position between the seats.

4. The cabinet of claim 1 wherein said access panel of said file drawer comprises a small compartment for holding objects.

5. The cabinet of claim 4, wherein said compartment is disposed on an outer face of said access panel of said file drawer.

6. The cabinet of claim 1 wherein the vehicle is a large commercial truck of United States Department of Transportation Class 6, 7, or 8.

7. The cabinet of claim 1 further comprising a first set of fasteners connecting said cabinet to the front cab floor and a second set of fasteners connecting said cabinet to the front cab seat.

8. The cabinet of claim 7 wherein said second set of fasteners connect to the front seat so that the front seat lifts away from said cabinet from one edge of said cabinet.

9. The cabinet of claim 8 wherein said cabinet further comprises a tabletop at a top of said cabinet.

10. The cabinet of claim 1 further comprising a backrest disposed on the front seat that is foldable forward and comprises a tabletop.

11. The cabinet of claim 1 wherein said cabinet is integral to the front seat.

12. The cabinet of claim 1 further comprising a locking component disposed on said file drawer.

13. The cabinet of claim 12 wherein said locking component is in communication with an air brake system of the vehicle and is engageable in response to air pressure derived from an air brake system when the vehicle is moving.

14. The cabinet of claim 12 wherein said locking component is in communication with a vehicle component that communicates an on or off signal to said locking component, so that said locking component is engageable in response to the on or off signal from the vehicle.

15. The cabinet of claim 1 wherein said file drawer comprises a plurality of fasteners to position files in said cabinet when said file drawer is closed.

16. The cabinet of claim 1 wherein the front cab seat is a vehicle operator's seat.

17. The cabinet of claim 1 wherein the front cab seat is a passenger seat.

18. The cabinet of claim 1 wherein said opening of said wall is on a front position of the front seat so that said file drawer slides to said open positional a front of the front seat.

19. The cabinet of claim 1 wherein said opening of said wall is on a side of the front seat so that said file drawer slides to said open position at a side of the front seat.

20. The cabinet of claim 1 wherein said opening of said wall is on a back position of the front seat so that said file drawer slides to said open position behind the front seat.

21. A container for use in a vehicle, said container comprising:
a base support disposed within a driver compartment of said vehicle, said driver compartment including a front seat;
upstanding walls connected to said base support;
an upper surface connected to said walls;
a door disposed in said container, said container fully disposed directly underneath the front seat when in a closed position; and
a locking component disposed on said door, said locking component in communication with a vehicle component that communicates an on or off signal to said locking component, so that said locking component is engageable in response to said on or off signal from the vehicle; and
said container closed on all sides so that items may be securely stowed within said container; and
said container accessible by an operator seated in the driver compartment without having to exit the vehicle.

22. A method for using a cabinet in a vehicle having a front cab with a seat and floor, comprising the steps of:
providing a base support;
connecting upstanding walls to said base support;
connecting an upper surface to the walls;
connecting a drawer to the cabinet;
disposing the cabinet between the cab seat and floor, the cabinet supporting the cab seat and fully disposing the cabinet directly underneath the cab seat;
locking the cabinet when the vehicle is turned on via a locking component in communication with a vehicle component that communicates an on or off signal to said locking component so that said locking component is engageable with an "on" signal from the vehicle; and
unlocking the cabinet when the vehicle is turned off via an unlocking component engageable with, and in communication with, an "off" signal from the vehicle;
forming an enclosure closed on all sides within the cabinet; and
securely stowing items within the cabinet; and
accessing the cabinet by an operator seated in the driver compartment without having to exit the vehicle.

23. The method of claim 22 wherein the steps of locking and unlocking the cabinet comprise engaging and disengaging the locking and unlocking component in response to air pressure derived from an air brake system of the vehicle, the air brake system being in communication with the locking and unlocking component.

* * * * *